United States Patent
Kulkarni et al.

(10) Patent No.: US 11,510,210 B2
(45) Date of Patent: Nov. 22, 2022

(54) FLEXIBLE RADIO ASSIGNMENT FOR MULTI-LINK CAPABLE ACCESS POINTS

(71) Applicant: Cisco Technology, Inc., San Jose, CA (US)

(72) Inventors: Santosh Babaji Kulkarni, San Jose, CA (US); Vishal Satyendra Desai, San Jose, CA (US); Pooya Monajemi, Irvine, CA (US); Benjamin Jacob Cizdziel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 17/171,741

(22) Filed: Feb. 9, 2021

(65) Prior Publication Data
US 2022/0256527 A1    Aug. 11, 2022

(51) Int. Cl.
*H04W 72/04* (2009.01)
*H04W 8/00* (2009.01)
*H04L 5/00* (2006.01)

(52) U.S. Cl.
CPC ......... *H04W 72/048* (2013.01); *H04L 5/0032* (2013.01); *H04W 8/005* (2013.01)

(58) Field of Classification Search
CPC .... H04W 72/048; H04W 8/005; H04L 5/0032
See application file for complete search history.

(56) References Cited

U.S. PATENT DOCUMENTS

| | | | |
|---|---|---|---|
| 9,843,965 B2 | 12/2017 | Pandey et al. | |
| 10,433,189 B2 | 10/2019 | Desai et al. | |
| 10,609,571 B2 | 3/2020 | Desai et al. | |
| 2015/0208330 A1 | 7/2015 | Park et al. | |
| 2016/0295638 A1 | 10/2016 | Allanki et al. | |
| 2017/0324439 A1* | 11/2017 | Desai ................ | H04W 72/0433 |
| 2017/0347312 A1 | 11/2017 | Kang et al. | |
| 2018/0288758 A1 | 10/2018 | Cordeiro et al. | |
| 2019/0268956 A1 | 8/2019 | Xiao et al. | |
| 2020/0221545 A1 | 7/2020 | Stacey et al. | |
| 2020/0305008 A1 | 9/2020 | Henry et al. | |

FOREIGN PATENT DOCUMENTS

WO    2020091332 A1    5/2020

\* cited by examiner

*Primary Examiner* — Yaotang Wang
(74) *Attorney, Agent, or Firm* — Merchant & Gould P.C.

(57) ABSTRACT

Management of radio resources of a wireless network according to a Flexible Radio Assignment (FRA) mode may be provided. For each Access Point (AP) of the wireless network: a type of AP may be identified including determining whether each AP has Multi-Link (ML) capability, and when the FRA mode is for performance, a bias may be applied to each ML capable AP to reduce a likelihood of a radio of each ML capable AP being identified as a redundant radio. For each Client Device (CD) of the wireless network, an identification of whether each CD has ML capability may be made, and a radio configuration of at least one ML capable AP may be tailored to support one or more ML capable CDs.

20 Claims, 5 Drawing Sheets

FLEXIBLE RADIO ASSIGNMENT FOR MULTI-LINK CAPABLE ACCESS POINTS

TECHNICAL FIELD

The present disclosure relates generally to managing radio resources in a wireless environment.

BACKGROUND

When configuring a wireless network, Access Points (APs) having similar or varying physical and operational capabilities may be deployed at particular locations in attempting to serve Client Devices (CDs) as part of providing a quality experience for users of a wireless network. For example, APs may be deployed to form a wireless network according to a map layout and an anticipated load of client users connecting to APs of the wireless network. A radio resource management procedure may be used when attempting to efficiently manage available radio resources of APs of the wireless network.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Management of radio resources of a wireless network according to a Flexible Radio Assignment (FRA) mode may be provided. For each Access Point (AP) of the wireless network: a type of AP may be identified including determining whether each AP has Multi-Link (ML) capability, and when the FRA mode is for performance, a bias may be applied to each ML capable AP to reduce a likelihood of a radio of each ML capable AP being identified as a redundant radio. For each Client Device (CD) of the wireless network, an identification of whether each CD has ML capability may be made, and a radio configuration of at least one ML capable AP may be tailored to support one or more ML capable CDs.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Radio Resource Management (RRM) may be used in wireless networks to manage radio resources when attempting to fulfill higher throughput and quality of service requirements for accessing users, such as in a high client density environment (e.g., building floor, conference room, classroom, lecture hall, auditorium, sports arena, etc. with a high number of concentrated clients). For example, when planning and deploying a wireless network, one or more Access Points (APs) may be placed near locations expected to have a higher user density (e.g., common sitting areas, such as an auditorium, a waiting room, conference room, etc.).

In some cases, a load on one or more APs may ramp up or down as new Client Devices (CDs) move into and out of range of the one or more APs. RRM may be used to manage a wireless network having a significant number and density of APs that are deployed to cover an area having, or anticipating, a dense client base. In some cases, to accommodate demands of a dense client base, APs may be added to the wireless network to increase the AP density. However, an increase in AP density may result in undesirable co-channel interference and reduced performance for AP radios transmitting signals using the same channel of a frequency band.

Previously, RRM has used a Flexible Radio Assignment (FRA) technique to assist in the identification of excessive 2.4 Gigahertz (GHz) radios and attempt to transform 2.4 GHz radios into a different non-serving role, such as a monitor role or sniffer role for example. With the introduction of the Institute of Electrical and Electronics Engineers (IEEE) 802.11be enhancements that include Multi-Link (ML) device capabilities, it is anticipated that ML capable APs will coexist in the field with legacy devices (e.g., IEEE 802.11ax, IEEE 802.11ac, etc.). Since existing FRA techniques are primarily focused around coverage-based redundancy, prior FRA techniques may detrimentally affect ML device operations and alleviate advantages envisioned for ML capable devices.

The present disclosure provides RRM and FRA for wireless environments that include network devices having ML capabilities. As described below, according to one example aspect, FRA may be tailored for performance so that ML capable APs and/or ML capable CDs are prioritized when allocating AP radio resources of a wireless network. For example, FRA may apply a bias to favor ML capable APs and/or ML capable CDs in attempting to provide increased capacity and/or additional throughput utilizing ML capabilities.

As described in greater detail below, radio resources may be allocated by FRA so that radio interfaces or radios of one or more APs having ML capability may be configured to support particular types of CDs. For example, when the performance mode is supported, FRA may apply a bias for ML capable APs to reduce a likelihood of a ML capable radio being identified as redundant and transitioned from a desired serving state to an undesired state and thereby prioritize service for ML capable CDs. FRA may be used to dynamically adjust one or more radios of APs having ML capability and/or not having ML capability to serve a plurality of CDs including ML capable CDs and thereby may optimize radio resources in times of high density client associations.

In another example aspect, RRM utilizes an FRA tailored to support a connectivity mode so that one or more APs without ML capabilities (e.g., legacy devices) have limited disruption after a radio role change event from FRA. In one example, when executing FRA in the connectivity mode, biases may be applied for one or more APs without ML capabilities to reduce a likelihood of a radio of each AP without ML capability being identified as a redundant radio when managing and allocating radio resources of the APs of the wireless network. In another example, when the FRA mode is set for connectivity, a different bias (i.e., a bias different than the bias applied during performance mode) may be applied to each ML capable AP in the FRA computation to reduce a likelihood of radios of legacy APs (e.g., non-ML capable APs) being selected as redundant. Similarly, when in the connectivity mode, CDs without ML capability may be prioritized in the FRA determination when transforming radio resources of the APs.

Figure 1:
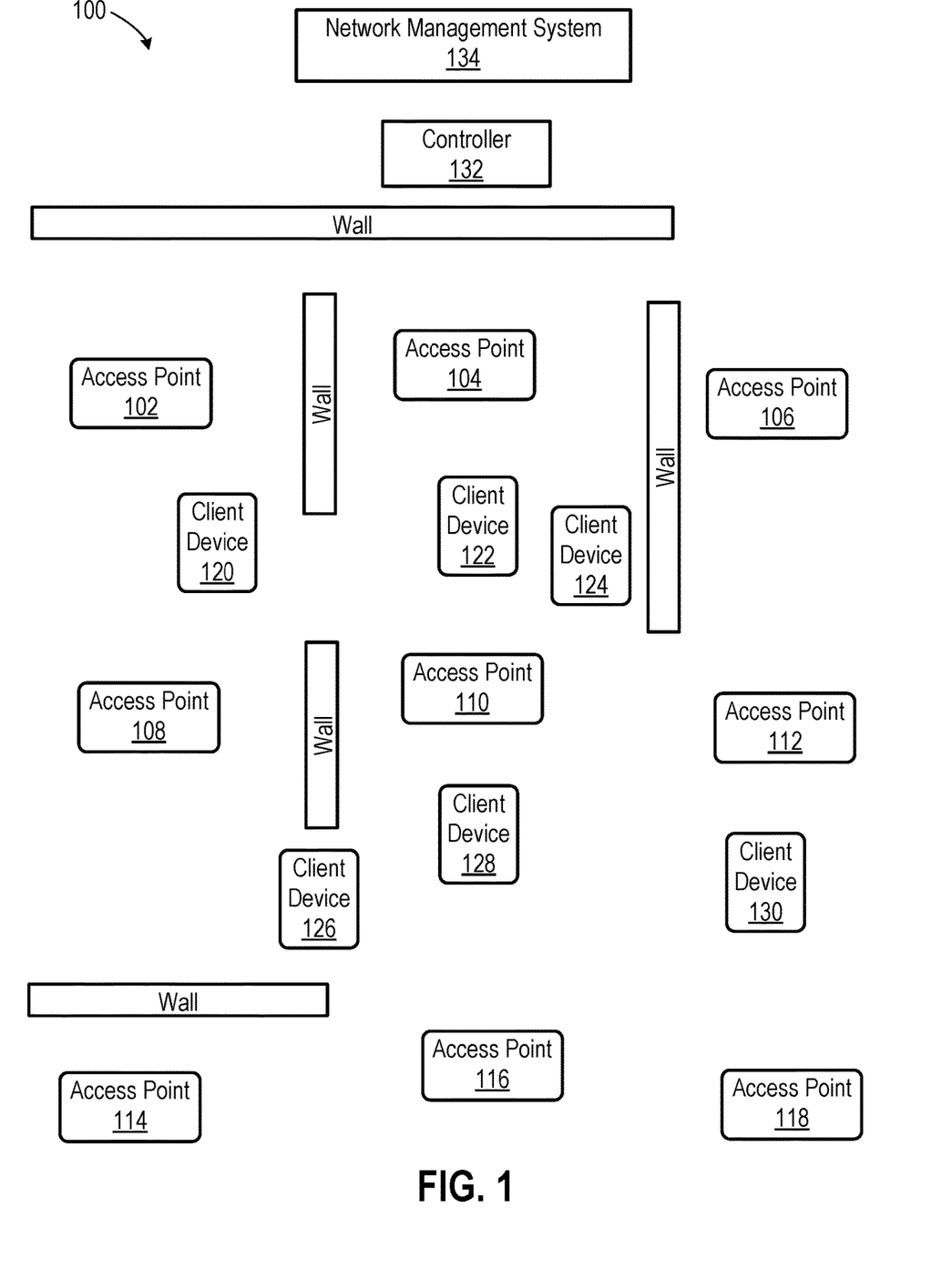
FIG. 1 is a block diagram of wireless network.

FIG. 1 shows a block diagram of an exemplary wireless network 100 for managing radio resources using an FRA tailored for ML device capabilities. For the example of FIG. 1, wireless network 100 (e.g., a Wireless Local Area Network (WLAN)) includes a plurality of APs including AP 102, AP 104, AP 106, AP 108, AP 110, AP 112, AP 114, AP 116, and AP 118. The layout of APs of wireless network 100 may be representative of a building floor or other representative space that includes different areas separated by walls or other physical barriers and may anticipate a high density client base that may or may not include fluctuating numbers and/or locations of CDs. For illustration purposes, a number of exemplary CDs (CD 120, CD 122, CD 124, CD 126, CD 128, and CD 130) are located throughout the wireless network which are shown in relation to AP 102, AP 104, AP 106, AP 108, AP 110, AP 112, AP 114, AP 116, and AP 118.

AP 102, AP 104, AP 106, AP 108, AP 110, AP 112, AP 114, AP 116, and AP 118 may be networking hardware devices that enable CD 120, CD 122, CD 124, CD 126, CD 128, and CD 130 to connect to wireless network 100. APs and CDs may be distributed throughout wireless network 100 and may include ML capabilities and/or legacy capabilities. As an example, one or more APs may be configured with two radio interfaces where the first radio interface supports the 5 GHz frequency band and the second radio interface is a flexible radio interface (e.g., XOR radio) that may dynamically switch between different frequency bands (e.g., 2.4 GHz, 5 GHz, 6 GHz, etc.) to transmit signals using a desired frequency band (e.g., either 2.4 GHz, 5 GHz, 6 GHz, etc.). Depending on a type of AP configuration, radios of the AP may be active simultaneously on the same frequency band or on different frequency bands. For example, an XOR radio and a dedicated 5 GHz radio of an AP may simultaneously or non-simultaneously transmit signals using different channels of the 5 GHz frequency band.

A controller 132 may manage and configure AP 102, AP 104, AP 106, AP 108, AP 110, AP 112, AP 114, AP 116, and AP 118. Controller 132 may be provisioned as a master AP, a cloud-based device, a separate device, and/or otherwise configured. In some examples, controller 132 may be used to initiate RRM and FRA as part of configuring radio interfaces of one or more APs of wireless network 100. CD 120, CD 122, CD 124, CD 126, CD 128, and CD 130 may comprise any type of device capable of accessing wireless network 100 such as, but is not limited to, a laptop computer, a tablet computer, a smart phone, wearable computing device, an Internet-of-Things (IoTs) device, among other devices capable of accessing and using wireless network 100 via one or more APs. As described herein, certain CDs may or may not be ML capable.

In some examples, APS and CDs may comprise multiple radios. For example, CD 120 may have multiple radios and Simultaneous Transmit Receive (STR) capability (e.g., a multi-radio STR) or may have multiple radios without having STR capability (e.g., a multi-radio non-STR). In other examples, CD 120 may comprise a single radio. For example, CD 120 may have a single radio with enhanced capabilities or a single radio without enhanced capabilities.

ML capability enables network devices to transmit on at least two different links established during multi-link set up. However, depending on the ML capabilities of each network device, a number of links that may be active at a same time varies. For example, if CD 120 includes single radio capabilities, CD 120 may only be active on one link at a time and thus, only capable of transmitting data on one link at a time. Alternatively, if CD 120 is a multi-radio with or without STR capabilities, CD 120 may be active on and thus transmit on two different links at the same time. When transmitting on two different links simultaneously, in some examples, CD 120 may transmit on two links within a same Radio Frequency (RF) band (e.g., transmit on two different channels within one of 2.4 Ghz, 5 Ghz, or 6 Gz bands). In other examples, CD 120 may transmit on two links within different RF bands (e.g., transmit on a channel of 5 GHz band and on a channel of 6 GHz band).

In some examples, a network management system 134 may manage and/or control aspects of one or more wireless networks including wireless network 100. For example, network management system 134 may initiate RRM to configure radio resources of wireless network 100. One non-limiting example of network management system 134 is the Cisco® Digital Network Architecture Center (DNA-C). As described below, network management system 134 may utilize RRM techniques to quantify a current or projected configuration of network devices operating in a wireless environment (e.g., wireless network 100) including knowledge and/or operational information associated with each network device including types of radio interfaces and/or usage parameters of each type of radio interface.

In some aspects, network management system 134 and/or controller 132 may coordinate RRM to configure radio resources of wireless network 100 which may include controlling timing and/or configuring of how FRA is to identify potential co-channel interference sources when managing radio resources of one or more of AP 102, AP 104, AP 106, AP 108, AP 110, AP 112, AP 114, AP 116, and AP 118. As described below with respect to FIG. 2, network management system 134 or controller 132 may set an FRA mode for performance when wireless network 100 includes a certain density of ML capable APs and/or ML capable CDs or set an FRA mode for connectivity when wireless network 100 does not include a certain density of ML capable APs and/or ML capable CDs. ML usage factors may be used to track a density of ML capable APs and ML capable CDs associated with wireless network 100.

In other embodiments of the disclosure, rather than APs, devices may be used that may be connected to a cellular network that may communicate directly and wirelessly with end use devices to provide access to wireless network 100 (e.g., Internet access). For example, these devices may comprise, but are not limited to, eNodeBs (eNBs) or gNodeBs (gNBs). A cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications. While FIG. 1 depicts a certain number of network devices, the wireless network 100 may include additional or fewer numbers of network devices including different numbers of controllers, APs, CDs, etc.

The elements described above of wireless network 100 (e.g., APs, CDs, controller 132, network management system 134) may be practiced in hardware and/or in software (including firmware, resident software, micro-code, etc.) or in any other circuits or systems. The elements may be practiced in electrical circuits comprising discrete electronic elements, packaged or integrated electronic chips containing logic gates, a circuit utilizing a microprocessor, or on a single chip containing electronic elements or microprocessors. Furthermore, the elements may also be practiced using other technologies capable of performing logical operations such as, for example, AND, OR, and NOT, including but not limited to, mechanical, optical, fluidic, and quantum technologies. As described in greater detail below with respect to FIG. 4, the elements may be practiced in a computing device 400.

Figure 2:
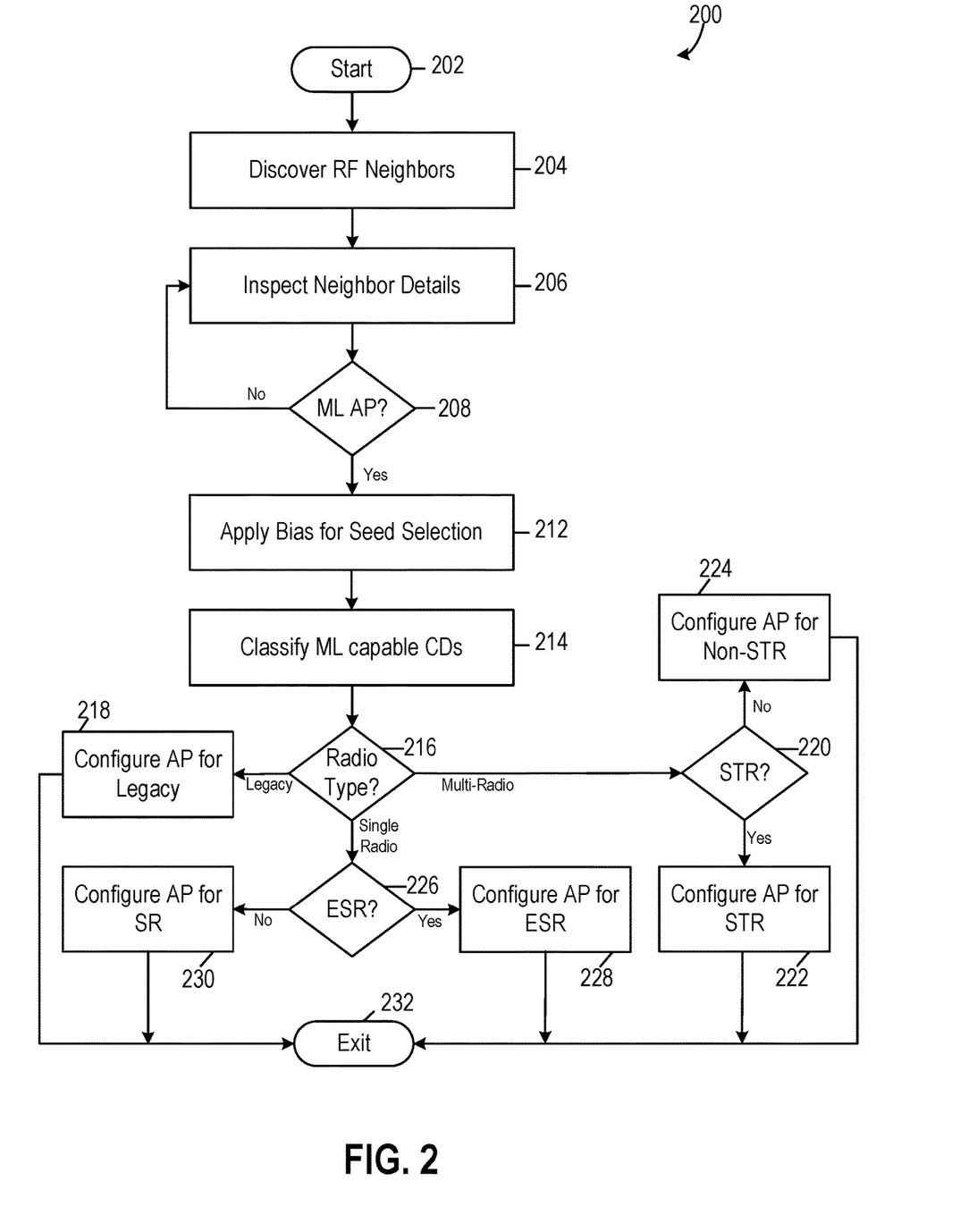
FIG. 2 is a flow chart of a method for managing wireless network radio resources using Flexible Radio Assignment (FRA)

FIG. 2 is a flow chart setting forth the general stages involved in a method 200 for RRM using FRA according to an FRA mode set for performance in a wireless environment (e.g., wireless network 100) that includes one or more APs that may or may not be ML capable and one or more CDs that may or may not be ML capable. Method 200 may be implemented using computing device 400 (e.g., controller 132 or network management system 134) as described in more detail below with respect to FIG. 4. Ways to implement the stages of method 200 will be described in greater detail below.

As described herein, FRA may be implemented using an FRA mode for performance, an FRA mode for connectivity, or some other FRA mode tailored for a particular application or scenario. When FRA mode is set for performance, method 200 attempts to prioritize ML device capabilities when allocating radio resources of wireless network 100. When FRA mode is set for connectivity, method 200 attempts to prioritize legacy device capabilities when allocating radio resources of wireless network 100. Controller 132 or network management system 134 may be used to initiate and/or coordinate RRM including setting which FRA mode to use when performing FRA as part of managing, configuring, and/or allocating radio resources of wireless network 100.

FRA uses a Neighbor Discovery Protocol (NDP) to locate each radio in RF distance and evaluate overlapping coverage by RF cell. FRA uses NDP measurements from each AP to plot coordinates (e.g., x and y coordinates) relative to every other AP as part of a solution set (e.g., AP Group, physical neighbors, etc.). A circumference of each RF cell may be calculated based on a current transmit power level of each AP being considered during FRA which provides a logical matrix of AP coverage intersections. FRA may then use a multipoint analysis to determine a Coverage Overlap Factor (COF) that quantifies overlapping coverage of one or more radios of each AP considered during FRA. For example, the COF may be used to represent a percentage of an analyzed cell that is covered at −67 decibel milliwatt (dBm) or higher by contributing AP radios. Depending on the sensitivity settings, FRA may be aware of every radio that sends an NDP above a certain threshold (e.g., −80 dBm) but may limit a COF determination to a certain number of loudest AP neighbors (e.g., 2, 3, 4, N loudest AP neighbors). Controller 132 or network management system 134 may coordinate FRA including an FRA mode and parameters to be used in the FRA computations.

Method 200 begins at block 202 and proceeds to stage 204 where method 200 operates to discover RF neighbors of a wireless environment, such as wireless network 100 for example. As described above, discovery of RF neighbors may include discovery of APs of wireless network 100 (e.g., one or more of AP 102, AP 104, AP 106, AP 108, AP 110, AP 112, AP 114, AP 116, and AP 118) using NDP. NDP enables one or more of AP 102, AP 104, AP 106, AP 108, AP 110, AP 112, AP 114, AP 116, and AP 118 to send and receive NDP packets that may include transmit power, channels, and/or other operational parameters as broadcast messages at regular intervals (e.g., every 30 seconds, every minute, etc.). NDP packet transmission and reception enables quantification of a current RF operational environment of wireless network 100, wherein each NDP packet includes one or more Received Signal Strength Indicator (RSSI) values and channels of AP neighbors which may be used to determine an actual RF path loss between APs.

At stage 206, method 200 inspects the neighbor details as a result of the RF neighbor discovery of stage 204. Method 200 at stage 206 may inspect AP neighbor details resulting from NDP packets transmitted within wireless network 100 to identify APs having ML and/or other capabilities. According to an aspect, a ML Information Element (IE) may be included in each NDP packet transmitted by an AP that carries ML capability and/or other RF capability information of a transmitting AP. In one aspect, at stage 206, method 200 may use controller 132 or network management system 134 to inspect an ML IE of an NDP packet to identify whether an AP is ML capable and/or a type of ML RF capability. For example, at stage 206, method 200 may use network management system 134 to inspect ML IEs of NDP packets to identify whether an AP is ML capable and/or has at least one of ML capability with Simultaneous Transmit Receive (STR) capability, ML capability without STR capability, ML capability with Enhanced Single Radio (ESR) capability, and/or ML capability with Single Radio (SR) capability. In some examples, the ML IE may be set to zero which identifies that a corresponding AP may not be ML capable (e.g., legacy capabilities).

An STR capable ML device may contain multiple radio interfaces or radios (e.g., dual 4×4 5 GigaHertz (GHz) radios with single 2.4 GHz radio and/or single 6 GHz radio), wherein each radio may operate independently of other radios. An N×N radio interface may be configured with N transmitters and N receivers. STR capable ML devices may have the capability to simultaneously transmit and receive signals using multiple radios. STR capable ML devices may utilize multiple radios to maximize performance given the independent radio operation. In an aspect, ML capable APs with STR may be assigned a highest priority in seed AP selection for FRA when determining COFs and redundant radios which may result reduce a likelihood of radios of ML capable APs with STR being identified as redundant.

ML capable devices without STR may contain multiple radios that may be incapable of operating independently. ML capable devices without STR may support simultaneous transmit functions or simultaneous receive functions on multiple radios but do not support simultaneous transmit and receive functions on multiple radios. For example, an ML capable AP without STR may use multiple radios for simultaneous transmission or simultaneous reception. ML capable APs without STR may be given a next highest priority after ML capable APs with STR in seed AP selection for FRA when determining COFs and redundant radios. As an example, FRA may identify a radio of a ML capable AP without STR as redundant if multiple neighboring APs are ML capable with STR to provide coverage to the cell area of the ML capable AP without STR.

ML devices with ESR (e.g., 2×2 devices) may be capable of concurrently monitoring two links but may only use a single link at a time when transmitting or receiving RF signals. A ML device with ESR may be able to dynamically switch from one link to another link. ML capable APs with ESR may be given a next highest priority in seed AP selection after ML capable APs without STR for FRA when determining COFs and redundant radios. As an example, FRA may identify a radio of a ML capable AP with ESR as redundant when ML capable APs with STR or without STR exist and are capable of providing cell coverage for the AP with ESR.

ML devices with Single Radio (SR) (e.g., 2×2 devices) may be capable of using a single link at a time when transmitting or receiving RF signals. Compared to an ML device with ESR, an ML device with SR may be unable to dynamically switch from one link to another link. ML capable APs with SR may be given a next highest priority in seed AP selection after ML capable APs with ESR for FRA when determining COFs and redundant radios. As an example, FRA may identify a radio of a ML capable AP with SR as redundant when ML capable APs with STR or without STR or ESR exist and are capable of providing cell coverage for the AP with SR.

With continuing reference to FIG. 2, at decision 208, if method 200 determines that an AP is not ML capable after inspecting the neighbor details, the AP is identified as a legacy AP and method 200 returns to stage 206 and decision 208. After identifying all ML capable APs within the discovered RF neighbors at decision 208, method 200 proceeds to stage 212 and applies a bias for ML capable APs during FRA so that radios of ML capable APs are less likely to be identified as redundant. At stage 212, a bias may be applied in general for ML capable APs for FRA so that radios of ML capable APs are less likely to be identified as redundant.

In an aspect, a different bias may be applied for each type of ML capable AP to further refine which radios are more likely or less likely to be identified by FRA as redundant and available to serve CDs. For example, at stage 212, method 200 may apply: a first bias for each ML capable AP with STR capability in order to reduce a likelihood of a radio of each ML capable AP with STR capability being identified as a redundant radio; a second bias for each ML capable AP without STR capability, wherein the second bias is less than the first bias such that a radio of each ML capable AP without STR capability may be identified as a redundant radio before identifying a radio of each ML capable AP with STR capability as being redundant; a third bias for each ML capable AP with ESR capability, wherein the third bias is less than the second bias such that a radio of each ML capable AP with ESR capability may be identified as a redundant radio before identifying a radio of each ML capable AP without STR capability as redundant; and/or apply a fourth bias to each ML capable AP with SR capability, wherein the fourth bias is less than the third bias such that a radio of each ML capable AP with SR capability may be identified as a redundant radio before identifying a radio of each ML capable AP with ESR capability as redundant.

Accordingly, when the FRA mode is for performance, FRA may result in radios of ML capable APs more likely being available to serve ML capable CDs after identification of redundant radios based on the COF, whereas radios of APs incapable of ML operation may more likely be identified as redundant. An applied bias for ML capable AP radios may ensure that these radios are not reassigned from a serving configuration to a non-serving configuration, which could be detrimental to ML capable CDs if a radio of a ML capable AP was reassigned to a non-serving configuration. FRA may assign radios identified as being redundant to a different role other than a serving role, such as a monitor role, sniffer role, security role, etc. to reduce potential radio interference by such redundant radios.

In an alternative aspect, when executing FRA according to an FRA mode for connectivity, a bias may be applied to APs not having ML capabilities so that during FRA radios of APs not having ML capabilities are less likely to be identified as redundant. As a result of the alternative aspect, radios of APs not having ML capabilities may be more likely to be available to serve CDs after identification of redundant radios.

With continued reference to FIG. 2, at stage 214, method 200 classifies CDs (e.g., CD 120, CD 122, CD 124, CD 126, CD 128, and CD 130) of wireless network 100 including determining whether or not each CD has ML capabilities and/or additional RF capabilities. For example, one or more CDs may broadcast probe frames or association frames that include identifying parameters (e.g., Media Access Control (MAC) address, manufacturer/model, channel(s), operating class, ML IE, etc.) into wireless network 100. The ML IE may be used to identify ML capability and/or other RF capability information of the one or more CDs. For example, an ML IE of a ML capable CD may carry single radio or multi-radio capabilities of the CD including whether capabilities include STR, non-STR, ESR, SR, etc. APs receiving probe frames, association frames, neighbor information, etc. may forward any pertinent identification and/or operational information including ML IEs to controller 132 or network management system 134.

According to an aspect, at stage 214, method 200 may use controller 132 or network management system 134 to inspect an ML IE of each CD of wireless network 100 to classify each CD as: legacy not ML capable; ML capable with STR; ML capable without STR; ML capable with ESR; and ML capable with SR. Once CDs are classified at stage 214, if a CD is determined to be a legacy device (e.g., not IEEE 802.11be compliant) at decision 216, method 200 proceeds to stage 218 where a radio interface of an associated AP may be configured for devices with legacy capability, such as a single radio 8×8 5 GHz serving radio for example, and exits at 232.

If a predefined number (e.g., a majority) of CDs are determined to be multi-radio devices (e.g., IEEE 802.11be compliant) at decision 216 and determined to have STR capability at decision 220, method 200 proceeds to stage 222. At stage 222, method 200 may configure one or more radio interfaces of an associated AP for devices with STR capability, before exiting at 232. For example, method 200 may configure the associated AP with dual 4×4 5 GHz serving radios when a predefined number of multi-radio ML capable CDs include STR capability. In some aspects, depending on the coverage overlap determination, a 2.4 GHz radio interface of the associated AP may also be transitioned from a serving role to a different role. For example, if an ML capable CD supports a dual 4×4 5 GHz radio configuration, method 200 may mark the 2.4 GHz radio as redundant for an associated ML capable AP that supports the dual 4×4 5 GHz radio configuration.

If a predefined number of CDs are determined to be multi-radio devices at decision 216 and determined to not have STR capability at decision 220, method 200 proceeds to stage 224. At stage 224, method 200 may configure one or more radio interfaces of an associated AP for devices without STR capability, before exiting at 232. For example, method 200 may configure the associated AP with dual 4×4 5 GHz serving radios or a single 8×8 5 GHZ serving radio when a predefined number of multi-radio ML capable CDs do not include STR capability. In some aspects, depending on the coverage overlap determination, a 2.4 GHz radio interface of the associated AP may be transitioned from a serving role to a different role.

If a predefined number of CDs are determined to be single-radio devices at decision 216 and determined to be ESR capable at decision 226, method 200 proceeds to stage 228. At stage 228, method 200 may configure one or more radio interfaces of an associated AP for devices with ESR capability, before exiting at 232. For example, method 200 may configure the associated AP with a single 8×8 5 GHZ serving radio or a single 4×4 5 GHz radio with a single 4×4 5 GHz monitor radio when a predefined number of single radio ML capable CDs include ESR capability.

If a predefined number of CDs are determined to be single-radio devices at decision 216 and determined not to be ESR capable at decision 226, method 200 proceeds to stage 230. At stage 230, method 200 may configure a radio of an associated AP for devices with SR capability, before exiting at 232. For example, method 200 may configure the associated AP with a single 8×8 5 GHZ serving radio or a single 4×4 5 GHz radio with a single 4×4 5 GHz monitor radio when a predefined number of single radio ML capable CDs include SR capability. A single 8×8 5 GHZ serving radio may enable adequate frequency reuse for any neighboring single-radio or multi-radio devices. In some aspects, single radio ML capable CDs that include SR or ESR capability may benefit from a dual 4×4 serving configuration for an associated AP.

FIGS. 3A-3D illustrate a number of example scenarios when executing FRA for APs and/or CDs having different operational capabilities. ML usage scores may be used with method 200 to further refine transformation of radio interfaces from one operational role to a different operational role. ML usage scores may be attributed to ML capable APs and/or ML capable CDs to further refine transformation of radio interfaces of a wireless environment. For example, an AP ML usage score may be used to quantify a number of ML capable APs, a density of ML capable APs, and/or types of ML capable APs of wireless network 100. A CD ML usage score may be used to quantify a number of ML capable CDs, a density of ML capable CDs, and/or types of ML capable CDs of wireless network 100. ML usage scores may be further subdivided for each type of network device (e.g., STR ML usage score, non-STR ML usage score, ESR ML usage score, SR ML usage score, etc.).

Figure 3A:
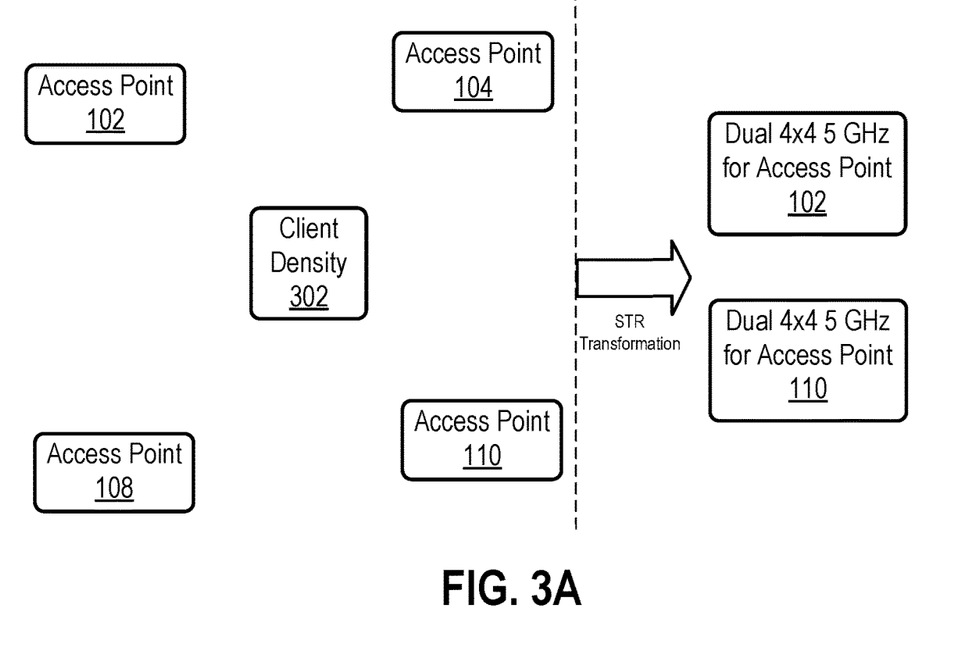
FIGS. 3A-3D illustrate a number of example scenarios when executing FRA.

FIG. 3A depicts a section of wireless network 100 that includes AP 102, AP 104, AP 108, and AP 110, where AP 102 and AP 110 are both ML capable with STR. Client density 302 may refer to CDs that are associated and have at least one wireless link established with one or more of AP 102, AP 104, AP 108, and AP 110. The resulting radio configurations for AP 102, AP 104, AP 108, and/or AP 110 from FRA transformations provided by method 200 are further refined by taking into consideration an AP ML usage score and/or a CD usage score for the section of wireless network 100.

For this example, radio configurations of AP 102 and AP 110 have each been configured to a dual 4×4 5 GHz serving configuration as a result of FRA. No radio configuration change has resulted for APs 104 and 108. For example, method 200 may configure FRA so that an AP ML usage score greater than or equal to a defined AP threshold and/or a ML CD usage score greater than or equal to a defined CD threshold forces a type of AP radio transition. For the example of FIG. 3A, the AP ML usage score reflects that a majority of AP 102, AP 104, AP 108, and AP 110 are ML capable with STR and the CD ML usage score reflects that a majority of CDs of client density 302 are ML capable with STR resulting in configuring radio interfaces of APs 102 and 110 to dual 4×4 5 GHz serving configurations.

Figure 3B:
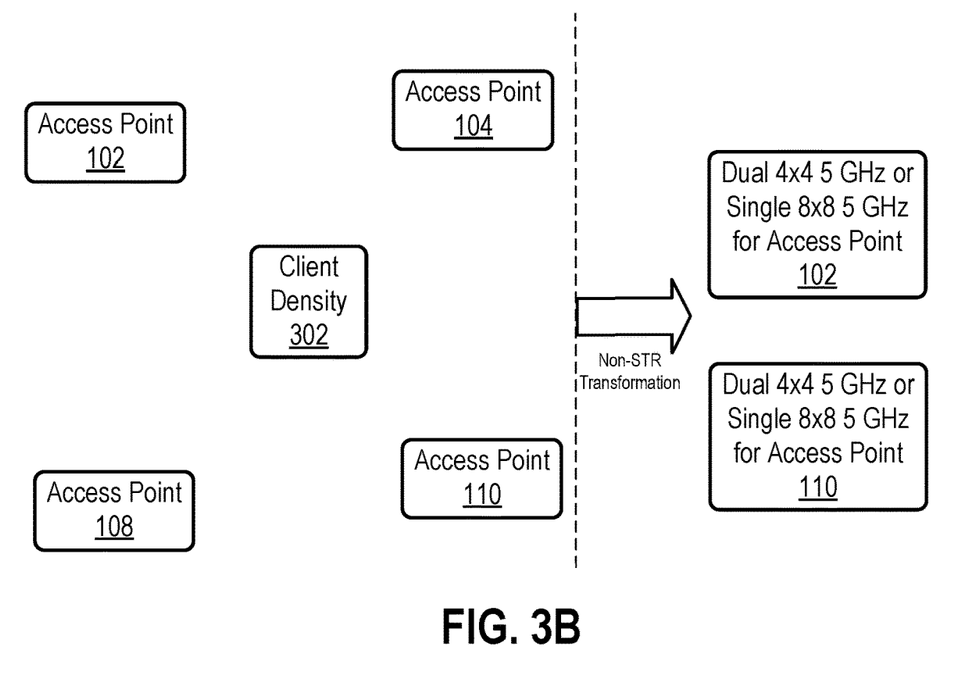

FIG. 3B depicts a different configuration of the same section of wireless network 100, where AP 102 and AP 110 are both ML capable without STR. Again, the resulting radio configurations for AP 102, AP 104, AP 108, and/or AP 110 from FRA provided by method 200 are further refined by taking into consideration an AP ML usage score and/or a CD usage score for the section of wireless network 100. For the example of FIG. 3B, a radio configuration of AP 102 has been configured to a dual 4×4 5 GHz or a single 8×8 5 GHz serving configuration and AP 110 has been configured to a dual 4×4 5 GHz or a single 8×8 5 GHz serving configuration as a result of FRA. No radio configuration change has resulted for APs 104 and 108. For the example of FIG. 3B, the AP ML usage score reflects that a majority of AP 102, AP 104, AP 108, and AP 110 are ML capable without STR and the CD ML usage score reflects that a majority of CDs of client density 302 are ML capable without STR resulting in the configurations of the radio interfaces of APs 102 and 110.

Figure 3C:
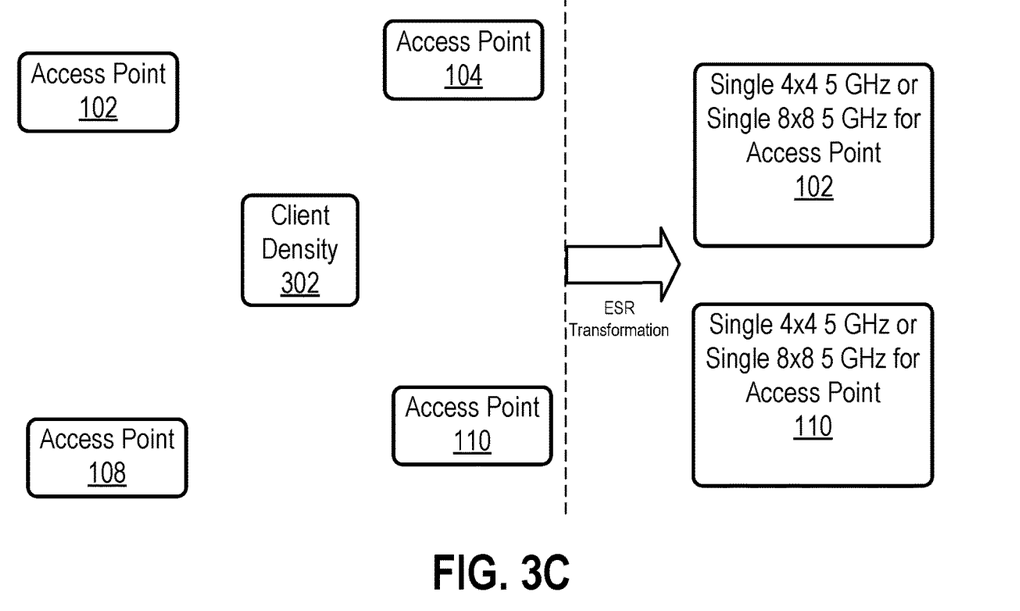

FIG. 3C depicts a different configuration of the same section of wireless network 100, where AP 102 and AP 110 are both ML capable with ESR. Again, the resulting radio configurations for AP 102, AP 104, AP 108, and/or AP 110 from FRA provided by method 200 are further refined by taking into consideration an AP ML usage score and/or a CD usage score for the section of wireless network 100. For the example of FIG. 3C, a radio configuration of AP 102 has been configured to a single 4×4 5 GHz radio with single 4×4 monitor radio or a single 8×8 5 GHz serving configuration and AP 110 has been configured to a single 4×4 5 GHz radio with single 4×4 monitor radio or a single 8×8 5 GHz serving configuration as a result of FRA. The AP ML usage score reflects that a majority of AP 102, AP 104, AP 108, and AP 110 are ML capable with ESR and the CD ML usage score reflects that a majority of CDs of client density 302 are ML capable with ESR resulting in the configurations of the radio interfaces of APs 102 and 110.

Figure 3D:
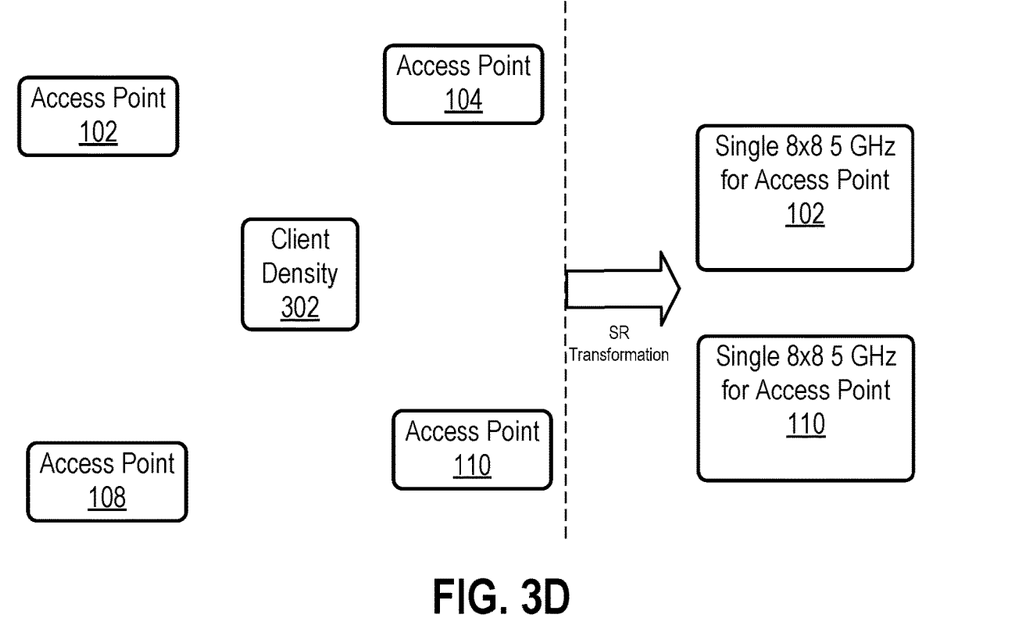

FIG. 3D depicts a different configuration of the same section of wireless network 100, where AP 102 and AP 110 are both ML capable with SR. Again, the resulting radio configurations for AP 102, AP 104, AP 108, and/or AP 110 from FRA provided by method 200 are further refined by taking into consideration an AP ML usage score and/or a CD usage score for the section of wireless network 100. For the example of FIG. 3D, AP 102 and AP 110 have each been configured to a single 8×8 5 GHz serving configuration as a result of FRA. No radio configuration change has resulted for APs 104 and 108. The AP ML usage score reflects that a majority of AP 102, AP 104, AP 108, and AP 110 are ML capable with SR and the CD ML usage score reflects that a majority of CDs of client density 302 are ML capable with SR resulting in the configurations of the radio interfaces of APs 102 and 110.

Figure 4:
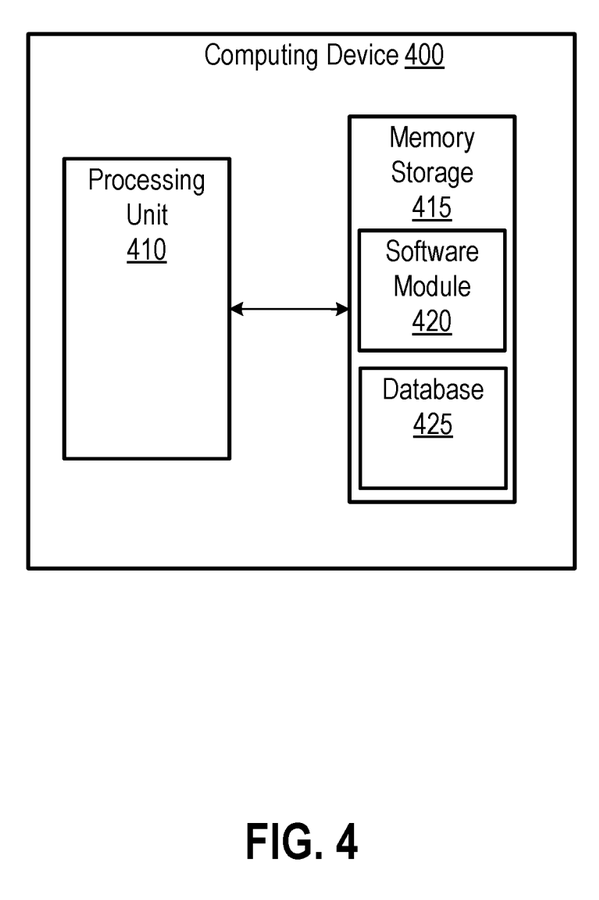
FIG. 4 is a block diagram of a computing device.

FIG. 4 shows computing device 400. As shown in FIG. 4, computing device 400 may include a processing unit 410 and a memory unit 415. Memory unit 415 may include a software module 420, database 425, and additional logic. While executing on processing unit 410, software module 420 may perform, for example, processes for managing radio resources as described herein. Computing device 400, for example, may provide an operating environment for controller 132, network management system 134, AP 102, AP 104, AP 106, AP 108, AP 110, AP 112, AP 114, AP 116, AP 118, CD 120, CD 122, CD 124, CD 126, CD 128, CD 130, etc. Other operational environments may be utilized, and the present disclosure is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    a processing unit; and
    memory storage that includes instructions which, when executed by the processing unit, causes the processing unit to:

manage radio resources of a wireless network according to a Flexible Radio Assignment (FRA) mode that includes discovery of Access Points (APs) and Client Devices (CDs) of a wireless network;

for each AP of the wireless network:
identify a type of AP that includes a determination of whether the AP has Multi-Link (ML) capability; and
when the FRA mode is for performance, apply a bias to a ML capable AP to reduce a likelihood of a radio of the ML capable AP being identified as a redundant radio;

for each CD of the wireless network, identify whether each CD has ML capability; and tailor a radio configuration of at least one ML capable AP to support one or more ML capable CDs.

2. The system of claim 1, wherein the processing unit is further caused to tailor the radio configuration of the at least one ML capable AP according to an AP ML usage score.

3. The system of claim 2, wherein the processing unit is further caused to tailor the radio configuration of the at least one ML capable AP according to a CD ML usage score.

4. The system of claim 1, wherein the processing unit is further caused to:
identify each ML capable AP having multiple radios and Simultaneous Transmit Receive (STR) capability;
apply a first bias to each ML capable AP having multiple radios and STR capability in order to reduce a likelihood of a radio of each ML capable AP having multiple radios and STR capability being identified as a redundant radio.

5. The system of claim 4, wherein the processing unit is further caused to:
identify each ML capable AP having multiple radios without STR capability; and
apply a second bias to each ML capable AP having multiple radios without STR capability, wherein the second bias is less than the first bias such that a radio of each ML capable AP having multiple radios without STR capability would be identified as a redundant radio before a radio of each ML capable AP having multiple radios and STR capability would be identified as a redundant radio.

6. The system of claim 5, wherein the processing unit is further caused to:
when the FRA mode is set for performance and a predefined number of multi-radio ML capable CDs include STR capability, tailor the radio configuration of the at least one ML capable AP having multiple radios and STR capability to a dual 4×4 serving configuration; and
when the FRA mode is set for performance and a predefined number of multi-radio ML capable CDs do not include STR capability, tailor the radio configuration of the at least one ML capable AP having multiple radios without STR capability to a dual 4×4 serving configuration or a single 8×8 serving configuration.

7. The system of claim 5, wherein the processing unit is further caused to:
identify each ML capable AP having a single radio with Enhanced Single Radio (ESR) capability;
apply a third bias to each ML capable AP having a single radio with ESR capability, wherein the third bias is less than the second bias such that a radio of each ML capable AP having a single radio with ESR capability would be identified as a redundant radio before a radio of each ML capable AP having multiple radios and not STR capability would be identified as a redundant radio;
identify each ML capable AP having a single radio with Single Radio (SR) capability; and
apply a fourth bias to each ML capable AP having a single radio with SR capability, wherein the fourth bias is less than the third bias such that a radio of each ML capable AP having a single radio with SR capability would be identified as a redundant radio before a radio of each ML capable AP having a single radio with ESR capability would be identified as a redundant radio.

8. The system of claim 7, wherein the processing unit is further caused to:
when the FRA mode is set for performance and a predefined number of single radio ML capable CDs include ESR capability, tailor the radio configuration of the at least one ML capable AP having a single radio with ESR capability to a single 8×8 serving configuration or a single 4×4 serving configuration; and
when the FRA mode is set for performance and a predefined number of single radio ML capable CDs include SR capability, tailor the radio configuration of the at least one ML capable AP having a single radio with SR capability to a single 8×8 serving configuration.

9. The system of claim 1, when the FRA mode is set for connectivity, the processing unit is further caused to apply a different bias to each ML capable AP to reduce a likelihood of selecting a radio of one or more non-ML capable APs as a redundant radio.

10. A method comprising:
managing radio resources of a wireless network according to a Flexible Radio Assignment (FRA) mode that includes discovering Access Points (APs) and Client Devices (CDs) of a wireless network;
for each AP of the wireless network:
identifying a type of AP including determining whether each AP has Multi-Link (ML) capability; and
when the FRA mode is for performance, applying a bias to each ML capable AP to reduce a likelihood of a radio of each ML capable AP being identified as a redundant radio;
for each CD of the wireless network, identifying whether each CD has ML capability; and
tailoring a radio configuration of at least one ML capable AP to support one or more ML capable CDs.

11. The method of claim 10, further comprising tailoring the radio configuration of the at least one ML capable AP according to at least one of an AP ML usage score and a CD ML usage score.

12. The method of claim 10, further comprising:
identifying each ML capable AP having multiple radios and Simultaneous Transmit Receive (STR) capability;
applying a first bias to each ML capable AP having multiple radios and STR capability in order to reduce a likelihood of a radio of each ML capable AP having multiple radios and STR capability being identified as a redundant radio;
identifying each ML capable AP having multiple radios without STR capability; and
applying a second bias to each ML capable AP having multiple radios and not STR capability, wherein the second bias is less than the first bias such that a radio of each ML capable AP having multiple radios without STR capability would be identified as a redundant radio before a radio of each ML capable AP having multiple radios and STR capability would be identified as a redundant radio.

13. The method of claim 12, further comprising:
when the FRA mode is set for performance and a predefined number of multi-radio ML capable CDs include STR capability, tailoring the radio configuration of the at least one ML capable AP having multiple radios and STR capability to a dual 4×4 serving configuration; and
when the FRA mode is set for performance and a predefined number of multi-radio ML capable CDs do not include STR capability, tailoring the radio configuration of the at least one ML capable AP having multiple radios and not STR capability to a dual 4×4 serving configuration or single 8×8 serving configuration.

14. The method of claim 12, further comprising:
identifying each ML capable AP having a single radio with Enhanced Single Radio (ESR) capability;
applying a third bias to each ML capable AP having a single radio with ESR capability, wherein the third bias is less than the second bias such that a radio of each ML capable AP having a single radio with ESR capability would be identified as a redundant radio before a radio of each ML capable AP having multiple radios and not STR capability would be identified as a redundant radio;
identifying each ML capable AP having a single radio with Single Radio (SR) capability; and
applying a fourth bias to each ML capable AP having a single radio with SR capability, wherein the fourth bias is less than the third bias such that a radio of each ML capable AP having a single radio with SR capability would be identified as a redundant radio before a radio of each ML capable AP having a single radio with ESR capability would be identified as a redundant radio.

15. The method of claim 14, further comprising:
when the FRA mode is set for performance and a predefined number of single radio ML capable CDs include ESR capability, tailoring the radio configuration of the at least one ML capable AP having a single radio with ESR capability to a single 8×8 serving configuration or a single 4×4 serving configuration; and
when the FRA mode is set for performance and a predefined number of single radio ML capable CDs include SR capability, tailoring the radio configuration of the at least one ML capable AP having a single radio with SR capability to a single 8×8 serving configuration.

16. The method of claim 10, further comprising when the FRA mode is set for connectivity, applying a different bias to each ML capable AP to reduce a likelihood of selecting a radio of one or more non-ML capable APs as a redundant radio.

17. A non-transitory computer-readable medium that stores a set of instructions which when executed perform a method executed by the set of instructions comprising:
managing radio resources of a wireless network according to a Flexible Radio Assignment (FRA) mode that includes discovering Access Points (APs) and Client Devices (CDs) of a wireless network;
for each AP of the wireless network:
identifying a type of AP including determining whether each AP has Multi-Link (ML) capability; and
when the FRA mode is for performance, applying a bias to each ML capable AP to reduce a likelihood of a radio of each ML capable AP being identified as a redundant radio;
for each CD of the wireless network, identifying whether each CD has ML capability; and
tailoring a radio configuration of at least one ML capable AP to support one or more ML capable CDs.

18. The non-transitory computer-readable medium of claim 17, further comprising tailoring the radio configuration of the at least one ML capable AP according to at least one of an AP ML usage score and a CD ML usage score.

19. The non-transitory computer-readable medium of claim 17, further comprising:
identifying each ML capable AP having multiple radios and Simultaneous Transmit Receive (STR) capability;
applying a first bias to each ML capable AP having multiple radios and STR capability in order to reduce a likelihood of a radio of each ML capable AP having multiple radios and STR capability being identified as a redundant radio;
identifying each ML capable AP having multiple radios without STR capability;
applying a second bias to each ML capable AP having multiple radios and not STR capability, wherein the second bias is less than the first bias such that a radio of each ML capable AP having multiple radios and not STR capability would be identified as a redundant radio before a radio of each ML capable AP having multiple radios and STR capability would be identified as a redundant radio;
identifying each ML capable AP having a single radio with Enhanced Single Radio (ESR) capability;
applying a third bias to each ML capable AP having a single radio with ESR capability, wherein the third bias is less than the second bias such that a radio of each ML capable AP having a single radio with ESR capability would be identified as a redundant radio before a radio of each ML capable AP having multiple radios and not STR capability would be identified as a redundant radio;
identifying each ML capable AP having a single radio with Single Radio (SR) capability; and
applying a fourth bias to each ML capable AP having a single radio with SR capability, wherein the fourth bias is less than the third bias such that a radio of each ML capable AP having a single radio with SR capability would be identified as a redundant radio before a radio of each ML capable AP having a single radio with ESR capability would be identified as a redundant radio.

20. The non-transitory computer-readable medium of claim 19, further comprising:
when the FRA mode is set for performance and a predefined number of multi-radio ML capable CDs include STR capability, tailoring the radio configuration of the at least one ML capable AP having multiple radios and STR capability to a dual 4×4 serving configuration;
when the FRA mode is set for performance and a predefined number of multi-radio ML capable CDs do not include STR capability, tailoring the radio configuration of the at least one ML capable AP having multiple radios and not STR capability to a dual 4×4 serving configuration or single 8×8 serving configuration;
when the FRA mode is set for performance and a predefined number of single radio ML capable CDs include ESR capability, tailoring the radio configuration of the at least one ML capable AP having a single radio with ESR capability to a single 8×8 serving configuration or a single 4×4 serving configuration; and
when the FRA mode is set for performance and a predefined number of single radio ML capable CDs include SR capability, tailoring the radio configuration of the at least one ML capable AP having a single radio with SR capability to a single 8×8 serving configuration.

* * * * *